United States Patent

Kato et al.

[11] Patent Number: 5,600,401
[45] Date of Patent: Feb. 4, 1997

[54] CAMERA HAVING EFFICIENT UTILIZATION OF SPACE FOR MOUNTED COMPONENTS

[75] Inventors: Minoru Kato, Kawasaki; Hidenori Miyamoto, Urayasu; Isao Soshi, Tokyo, all of Japan

[73] Assignee: Nikon Corporation, Tokyo, Japan

[21] Appl. No.: 666,831

[22] Filed: Jun. 19, 1996

Related U.S. Application Data

[63] Continuation of Ser. No. 183,854, Jan. 21, 1994, abandoned.

[30] Foreign Application Priority Data

Jan. 21, 1993 [JP] Japan .................................. 5-008638

[51] Int. Cl.$^6$ ..................................................... G03B 7/00
[52] U.S. Cl. ............................................ 396/542; 396/535
[58] Field of Search ............................. 354/485, 219, 354/225, 288

[56] References Cited

U.S. PATENT DOCUMENTS

| | | | |
|---|---|---|---|
| 3,670,639 | 6/1972 | Harnden | 354/485 |
| 3,846,805 | 11/1974 | Kiyohara et al. | 354/288 |
| 4,297,018 | 10/1981 | Murakami et al. | 354/288 |
| 4,427,281 | 1/1984 | Yamada | 354/289.12 |

Primary Examiner—David M. Gray

[57] ABSTRACT

A camera including a viewfinder having an objective lens with a first optical axis, and an eyepiece lens with a second optical axis. The objective lens and the eyepiece lens create an offset space in the camera because the lenses are located such that their optical axes differ. Components within the camera are mounted on a printed board positioned adjacent to the viewfinder such that the electrical components are located in the offset space. The camera is smaller in size because the space due to the offset portion of the viewfinder is efficiently utilized.

9 Claims, 4 Drawing Sheets

CAMERA HAVING EFFICIENT UTILIZATION OF SPACE FOR MOUNTED COMPONENTS

This application is a continuation of application Ser. No. 08/183,854, filed Jan. 21, 1994, now abandoned.

BACKGROUND OF THE INVENTION

1. Field of the Invention

The present invention relates to the internal structure of a camera and, more particularly, to the positioning of electronic components in the camera on a printed board adjacent to a viewfinder.

2. Description of the Related Art

For compact cameras, it is desirable to make the camera body small and compact for ease of carrying and handling. To accomplish this, the layout of the various electronic components incorporated within the camera body must be compact and efficient.

The internal structure of a prior art camera is shown in FIGS. 5 and 6. A lens barrel 101 is located in the center of the camera body. A film cartridge chamber 102 and a film windup chamber 103 are located on either side of the lens barrel 101. Film 105 inserted in the film cartridge chamber 102 is wound in the film windup chamber 103. A viewfinder 106 and a strobe light generating unit 107 are located above the film cartridge chamber 102. A printed board 109 is located above the film windup chamber 103. As seen in FIGS. 5 and 6, the viewfinder 106 includes an objective lens 106a having an optical axis A and an eyepiece lens 106c having an optical axis B. The optical axis A of the objective lens 106a and the optical axis B of the eyepiece lens 106c are offset in the film forwarding direction creating a comparatively large space 108 within the camera body. The strobe light generating unit 107 and other comparatively large components are located in the offset space 108.

A printed board 109 having electrical components 110 mounted thereon is positioned to avoid extending to an upper portion of the viewfinder 106 and to reduce the overall height of the camera. However, even if the printed board 109 extends to the upper portion of the viewfinder 106, the electrical components 110 disposed on the printed board 109 are not located between the printed board 109 and the viewfinder 106 such that the height of the camera is reduced. Specifically, the electrical components 110 mounted on the printed board 109 are disposed in a space within the camera which is allocated for their exclusive use.

In the prior art camera, when the space created by the offset portion of the viewfinder 106 is not large enough to position the components located within the camera, the space remains empty unutilized space. Furthermore, since the space for mounting electrical components 110 is a space allocated for their exclusive use, not only is the space created by the offset portion of the viewfinder 106 not utilized, but the disposition of further space for the exclusive use of mounted components results in a large size camera.

SUMMARY OF THE INVENTION

It is an object of the present invention to provide a camera which is relatively small and compact.

It is a further object of the present invention to provide a camera in which space within the camera for components is efficiently utilized.

It is another object of the present invention to provide a camera in which it is not necessary to allocate space exclusively for mounted components.

It is yet another object of the present invention to provide a camera in which unutilized space due to an offset portion of a viewfinder is utilized efficiently even when this space is comparatively small, thereby reducing the size of the camera.

Additional objects and advantages of the invention will be set forth in part in the description which follows and, in part, will be obvious from the description, or may be learned by practice of the invention.

The foregoing objects of the present invention are achieved by a camera including a viewfinder having an objective lens with a first optical axis (A), and an eyepiece lens with a second optical axis (B). The viewfinder has an offset portion created by positioning the objective lens and the eyepiece lens such that the two optical axes are different. The respective optical axes may be offset in a film forwarding direction or they may be offset in a direction perpendicular to the film forwarding direction. A printed board is located adjacent to the viewfinder and equipped with at least one electrical component, which is located between an outer wall of the viewfinder which forms the offset portion and the printed board. The camera is made compact because the viewfinder is arranged with mounted components positioned to utilize normally unutilized space within the camera.

BRIEF DESCRIPTION OF THE DRAWINGS

These and other objects and advantages of the present invention will become apparent and more readily appreciated from the following description of the preferred embodiments, taken in conjunction with the accompanying drawings, of which.

DESCRIPTION OF THE PREFERRED EMBODIMENTS

Figure 1:
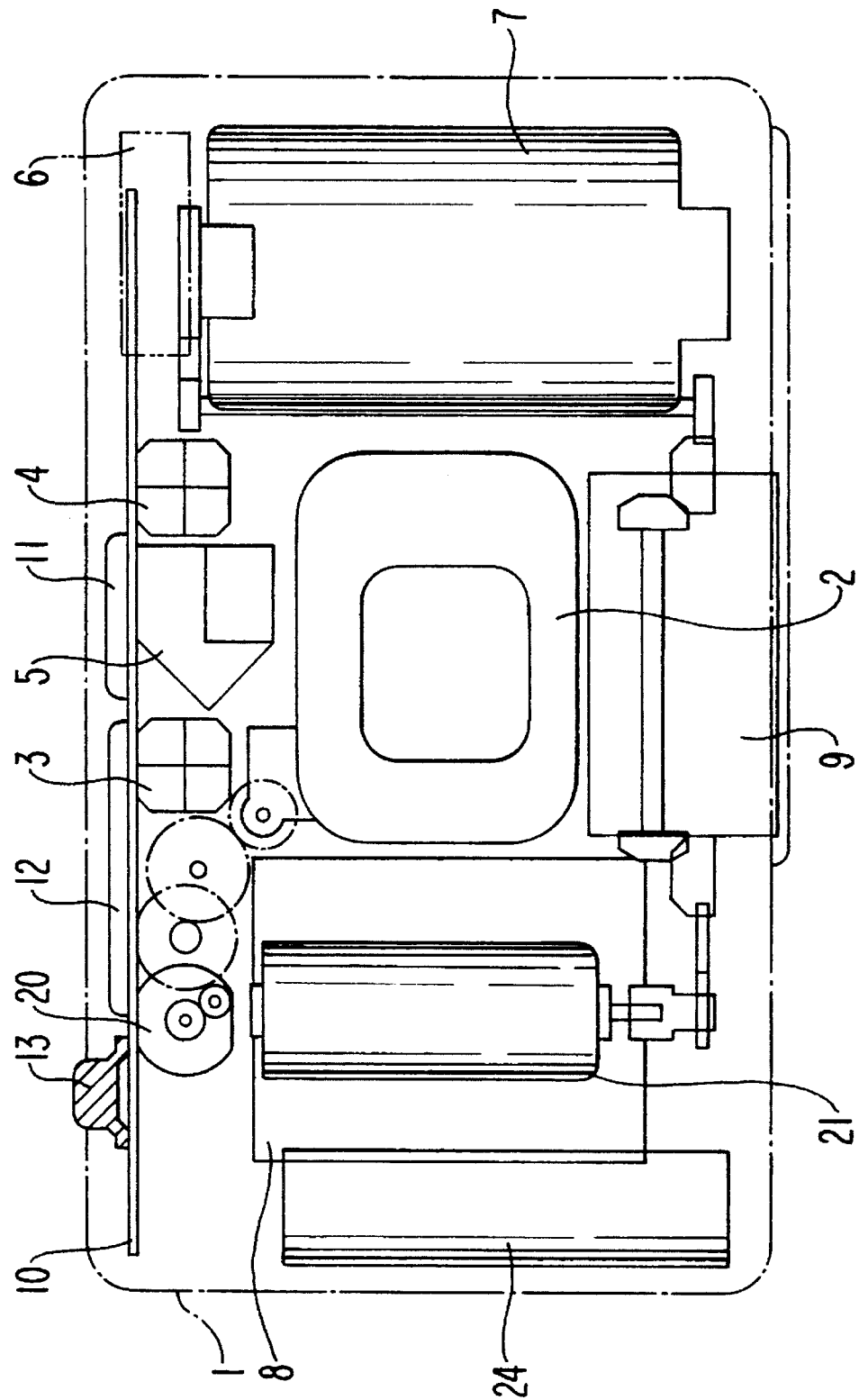
FIG. 1 is an elevational view of the internal structure of a camera in accordance with a first embodiment of the present invention.

Reference will now be made in detail to the present preferred embodiments of the invention, examples of which are illustrated in the accompanying drawings, wherein like reference numerals refer to like elements throughout.

Figure 2:
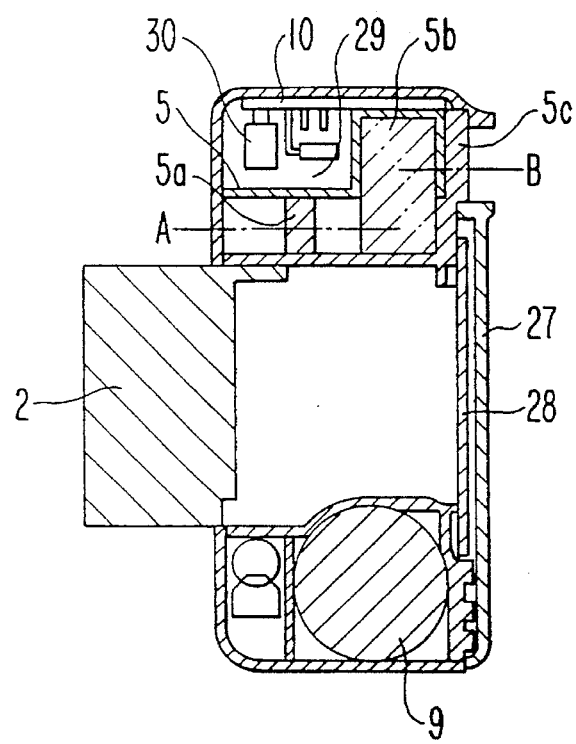
FIG. 2 is a vertical cross sectional view of a camera in accordance with the first embodiment of the present invention.

The first embodiment of the present invention will be described with reference to FIGS. 1 and 2. FIG. 1 is an elevational view of the internal structure of a camera 1 seen from the lens side of the camera 1 in accordance with a first embodiment of the present invention. FIG. 2 is a vertical cross sectional view of the camera 1 in accordance with the first embodiment of the present invention.

The camera 1 includes a light projection block 3 and light receiving block 4 located at the upper side of the interior of the camera 1 which constitute an autofocus ("AF") device. A viewfinder optical system 5, a strobe light generating unit 6, and an auto-exposure ("AE") device (not shown) and the like are also arranged on the upper side of the interior of the camera 1.

A film cartridge chamber 7 for loading of a film cartridge is located on the right-hand side of the interior of the camera 1. Film delivered from the film cartridge is wound up by a windup spool 21 into a film windup spool chamber 8 located on the interior left-hand side of the camera 1.

An electric battery 9 is located below the lens barrel 2. Gears for winding the film are located in front of the electric battery 9.

A condenser 24 for a strobe light (not shown) is located in juxtaposition to the wind up spool chamber 8, laterally of the spool chamber 8. A lens barrel 2 having a photographic lens optical system is interposed between the film cartridge chamber 7 and the film windup spool 8. The lens barrel 2 is driven by an electric motor 20 located upward of the spool chamber 8.

A mounting board 10 is located on the upper end side of the camera 1, adjacent the interior wall. The mounting board 10 is preferably a rigid board. However, the mounting board 10 may also be a flexible printed board ("FPC"). A control circuit 11 is located on the upper side of the mounting board 10. The control circuit 11 is preferably a CPU which performs control of the actions of each part of the camera. A display panel 12 displays various information including the settings of the action control state, the photographic mode of each part of the camera 1, and the number of photographs. The display panel 12 may be an LCD or similar type of display.

A release button 13 for performing a release operation projects from the upper end side of the camera 1. A back cover 27 and pressure plate 28 are disposed at the rear side (film surface side) of the camera 1.

The viewfinder 5 is a real image viewfinder and, as seen in FIG. 2, includes an objective lens 5a, a prism 5b, and an eyepiece lens 5c. The objective lens 5a has an optical axis A, and the eyepiece lens 5c has an optical axis B. The respective optical axes are separated in a direction perpendicular to the film forwarding direction by about 5 mm to 10 mm.

The prism 5b has four reflecting surfaces (not shown). Since the image incident from the objective lens 5a is reflected left, right and down, the prism 5b is larger than the objective lens 5a or the eyepiece lens 5b. Because of this, an offset space 29 is created because of the offset in the levels of the objective lens 5a and the prism 5b. Electronic components 30 are disposed in a portion of the offset space 29 and are mounted on the lower side of the rigid board 10.

Figure 3:
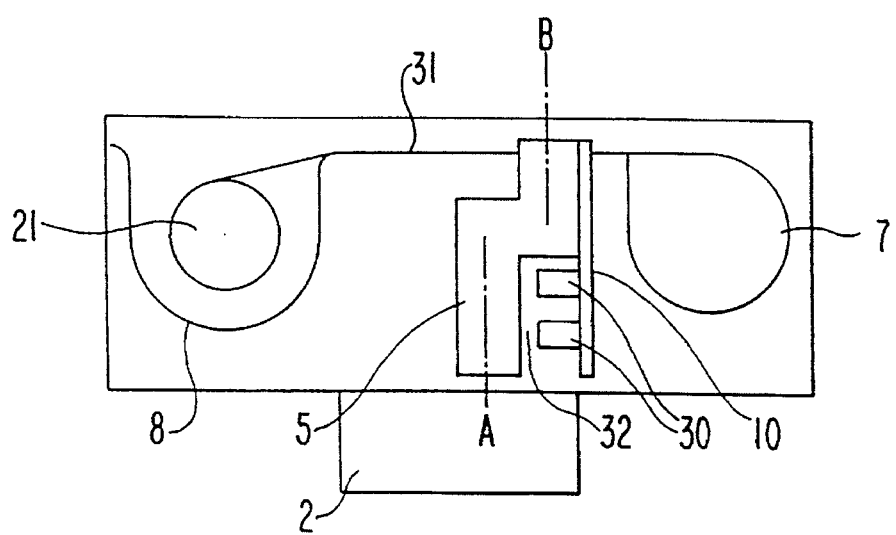
FIG. 3 is a top view of the internal structure of a camera in accordance with a second embodiment of the present invention.
Figure 4:
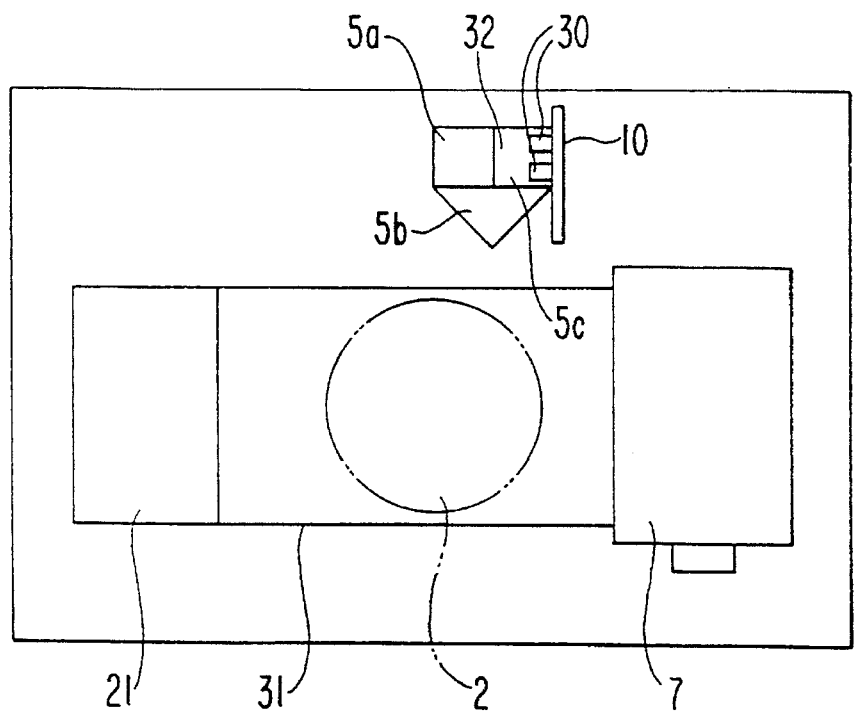
FIG. 4 is an elevational view of the internal structure of a camera in accordance with the second embodiment of the present invention.
Figure 5:
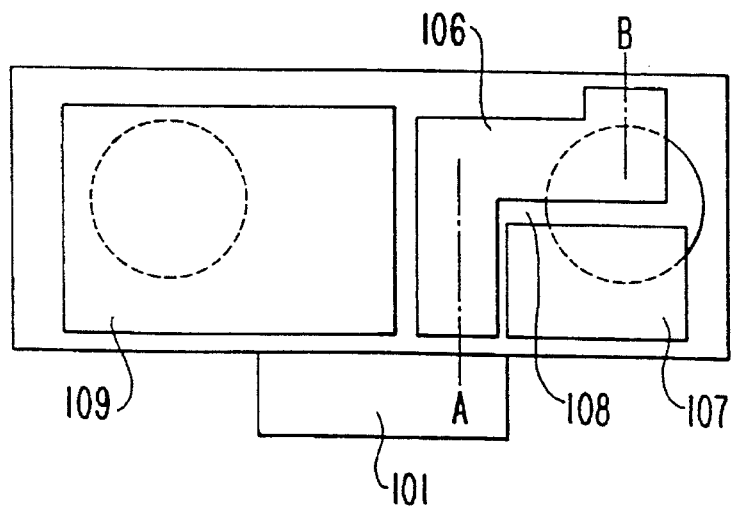
FIG. 5 is a top view of the internal structure of a prior art camera.
Figure 6:
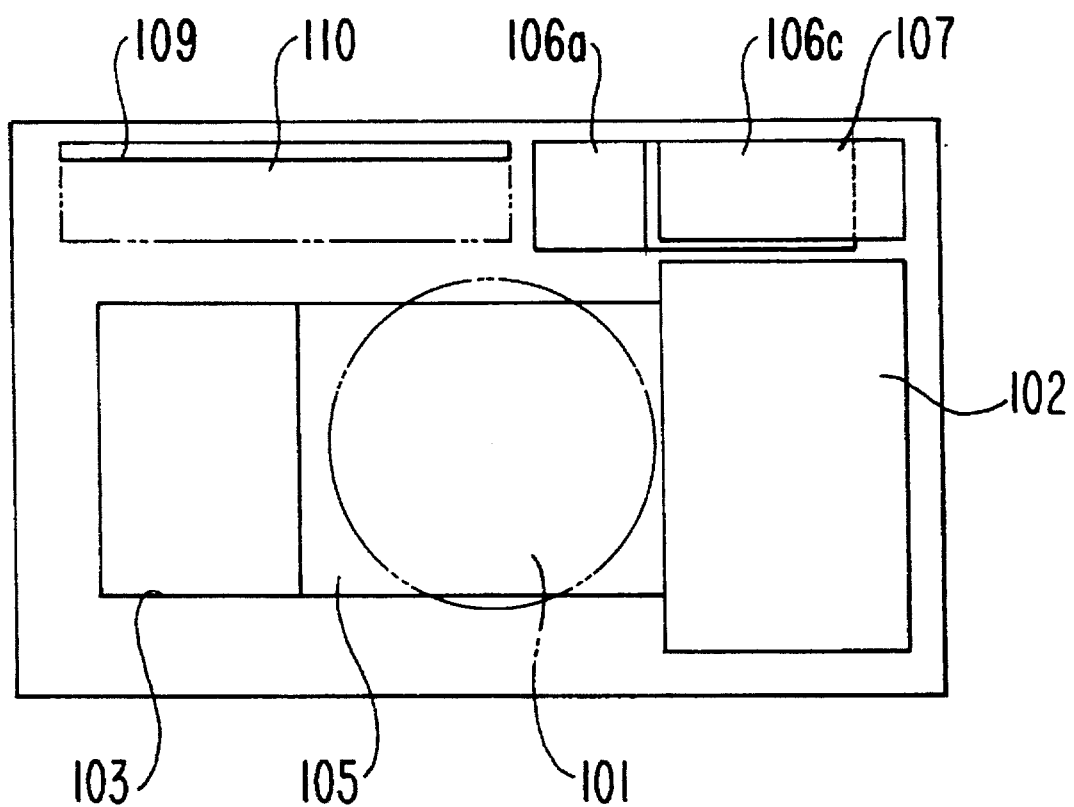
FIG. 6 is an elevational view, seen from the front, of the internal structure of a prior art camera.

FIGS. 3 and 4 show a second embodiment of a camera in accordance with the present invention. Like elements in the figures of the first and second embodiments have like reference numerals and a description of the like elements will not be repeated in detail. FIG. 3 is a top view of the internal structure of the camera 1, and FIG. 4 is an elevation view of the camera 1 as seen from the lens side of the camera 1. According to the second embodiment of the invention, the optical axes of the objective lens 5a and the eyepiece lens 5b are separated in the film forwarding direction.

As seen in FIGS. 3 and 4, film 31 received within the cartridge chamber 7 is wound up by a windup spool 21.

The viewfinder 5 which includes objective lens 5a having optical axis A and an eyepiece lens 5c having optical axis B, is formed such as to be slightly separated in the forwarding direction of the film 31. Because the optical axes A and B of the viewfinder 5 are formed with a displacement, an offset 32 is created as shown in FIGS. 3 and 4. The optical axes A and B are displaced by about 5 mm to 10 mm.

Electrical components 30 are mounted on the printed board 10 in the offset space 32 created by the offset portion of the viewfinder 5, and the printed board 10 is located adjacent to the viewfinder 5.

Therefore, in accordance with the present invention, because the viewfinder 5 is arranged such that mounted components on the printed board 10 are located within the camera in a space created by an offset portion of the viewfinder, space within the camera can be efficiently utilized. In addition, it is not necessary to provide a space exclusively for the mounted components, and the camera can be made compact.

Although a few preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. A camera, comprising:
   (a) a viewfinder including,
      (i) an objective lens having a first optical axis,
      (ii) an eyepiece lens having a second optical axis which is offset from the first optical axis to form an offset portion in a wall of the viewfinder; and
   (b) a printed board having a portion attached to the viewfinder and a portion extending from the viewfinder, and having at least one electrical component mounted thereon, the at least one electrical component being located between the offset portion of the wall of the viewfinder and the portion of the printed board extending from the viewfinder.

2. The camera, as recited in claim 1, wherein the first optical axis and the second optical axis are separated in a direction perpendicular to the direction of the respective optical axes.

3. The camera, as recited in claim 1, wherein the first optical axis and the second optical axis are separated in a direction perpendicular to a film forwarding direction.

4. The camera, as recited in claim 1, wherein the first optical axis and the second optical axis are separated in a direction which is parallel to a film forwarding direction.

5. The camera as recited in claim 2, wherein the first optical axis and the second optical axis are separated by a distance in a range of about 5 mm to 10 mm.

6. A camera, comprising:
   a viewfinder including an outer wall which forms an offset space within the camera; and
   a printed board positioned adjacent to the viewfinder, wherein the printed board includes at least one electrical component mounted thereon, the at least one electrical component being located between the outer wall of the viewfinder which forms the offset space and the printed board.

7. The camera, as recited in claim 6, wherein the printed board is attached to the viewfinder.

8. A camera, comprising:
   a mounting board located on an upper side of an interior of the camera;
   an autofocus device located below the mounting board, including a light projection block, and
a light receiving block;
a viewfinder optical system located below the mounting board between the light projection block and the light receiving block, the viewfinder optical system including
an objective lens having a first optical axis, and
an eyepiece lens having a second optical axis which is offset from the first optical axis in a direction perpendicular to a film forwarding direction to form an offset portion in the wall of the viewfinder optical system; and
an electronic component mounted on a lower side of the mounting board and disposed between the mounting board and the offset portion of the wall of the view finder optical system.

9. A camera, comprising:
a viewfinder, including
an objective lens having a first optical axis, and
an eyepiece lens having a second optical axis which is offset from the first optical axis in a film forwarding direction to form an offset portion in a wall of the viewfinder; and
a printed board having a portion attached to the viewfinder and having a portion extending from the viewfinder in a vertical plane approximately parallel to the viewfinder optical axes, and having an electrical component mounted thereon, the electrical component being located between the printed board and the offset portion of the wall of the viewfinder.

* * * * *